R. A. GAERTNER.
POWER NET ROLLER.
APPLICATION FILED JULY 22, 1920.
1,413,467.
Patented Apr. 18, 1922.
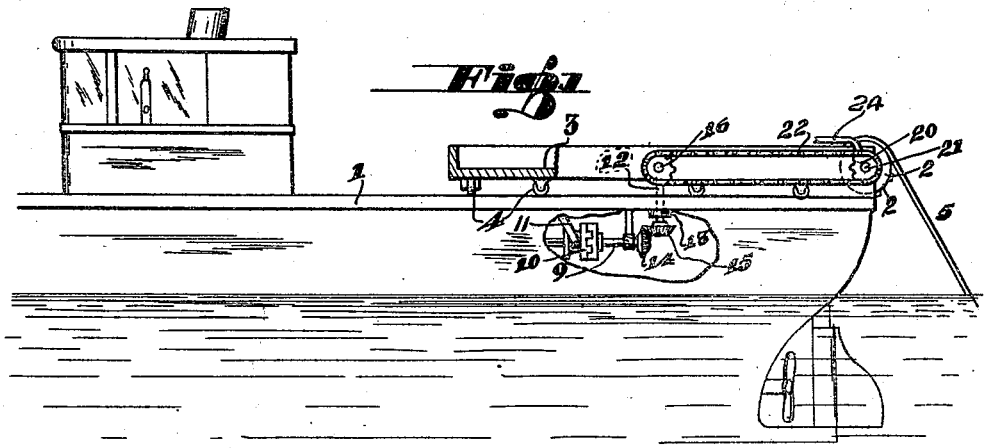
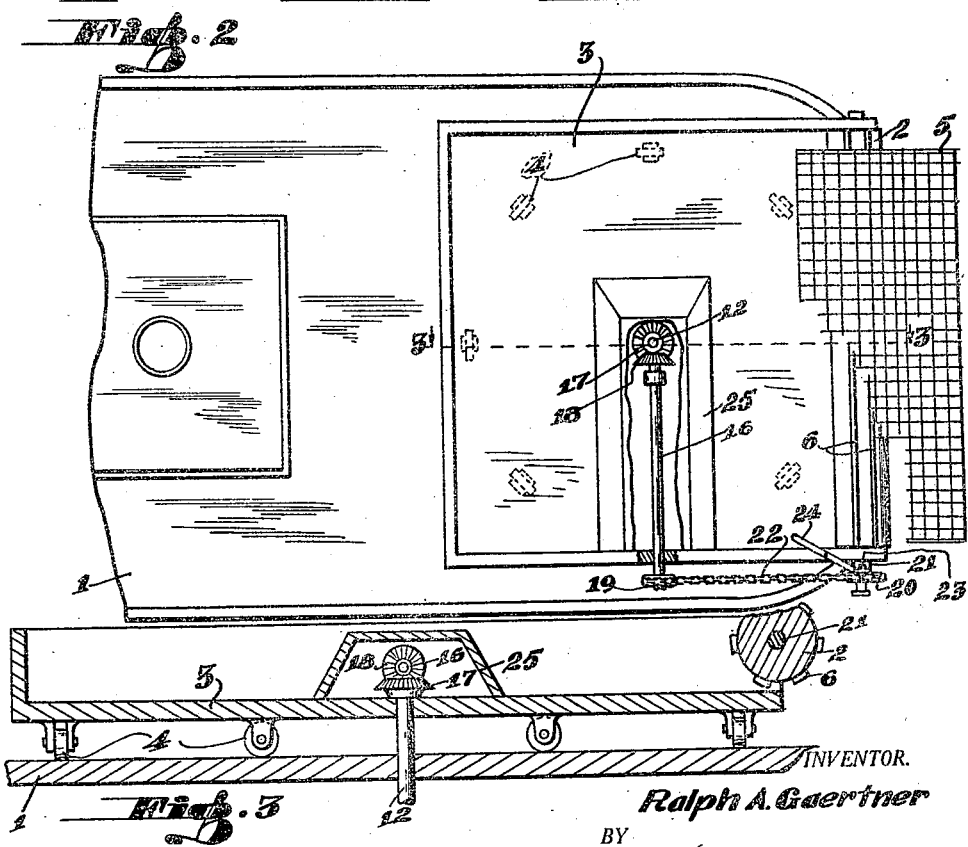
INVENTOR.
Ralph A. Gaertner
BY
Hazard & Miller
ATTORNEYS

UNITED STATES PATENT OFFICE.

RALPH A. GAERTNER, OF LOS ANGELES, CALIFORNIA.

POWER NET ROLLER.

1,413,467.

Specification of Letters Patent.   Patented Apr. 18, 1922.

Application filed July 22, 1920.   Serial No. 398,191.

*To all whom it may concern:*

Be it known that I, RALPH A. GAERTNER, a citizen of the United States, residing at Los Angeles, in the county of Los Angeles and State of California, have invented new and useful Improvements in Power Net Rollers, of which the following is a specification.

This invention relates to power net rollers employed in connection with usual net receiving tables of fishing boats, and has for its object the provision of a universal driving connection for a roller, adapted to actuate the same irrespective of the position to which the net table may be turned.

The invention will be readily understood from the following description of the accompanying drawings, in which—

Figure 1 is a side elevation of a vessel having a net table upon the deck thereof, the power roller of said table being provided with the improved driving connection.

Fig. 2 is a plan view of the deck of the vessel and the net table.

Fig. 3 is a transverse section on the line 3—3 of Fig. 2.

The power net roller is shown employed in connection with a usual net table which may be mounted upon the deck of any vessel 1. The power roller 2 is journaled at one of the sides of the net table 3 which is provided on its under side with the usual rollers 4 for permitting the net table to rotate freely in a horizontal plane so that the net 5 may be paid out or drawn in over roller 2 at either the stern or the sides of the vessel. The power roller 2 is, preferably, provided with cleats 6 extending along the same for providing a more positive engagement between the roller and the net when the latter is drawn upwardly onto the table.

A driving connection is provided for the power roller 2 which is arranged to function irrespective of the position to which the net table may be turned. As an instance of this arrangement a rotating power shaft 9 may be mounted within the vessel and rotated by any suitable driving connection (not shown) from the propeller shaft of the engine. A clutch 10 having an actuating lever 11 is, preferably, provided upon shaft 9 for controlling the operation of the driving connection for the power roller. An upright shaft 12 extends upwardly through the deck of the vessel and through the bottom of the net table at the pivotal axis thereof, said shaft being supported in any suitable manner as by a bearing 13 beneath the deck of the vessel.

A driving connection is provided from shaft 9 to shaft 12, which driving connection may consist of meshing bevel gears 14—15. A shaft 16 is journaled upon the net table with a driving connection from shaft 12 to said shaft at one end thereof, said driving connection consisting of meshing bevel gears 17—18. The opposite end of shaft 16, preferably, extends beyond the side of the net table and is provided with a sprocket wheel 19 in alinement with a sprocket wheel 20 upon the shaft 21 of the power roller 2. A sprocket chain 22 is received around these sprocket wheels, and a clutch 23 controlled by a lever 24 is, preferably, provided between sprocket wheel 20 and the shaft of the power roller. A suitable housing 25 may be received over the driving mechanism upon the net table.

In operation the entire driving connection may be thrown into and out of use by means of clutch 10, and when the net is being paid out the roller 2 may be allowed to freely rotate by disengaging clutch 23. When it is desired to draw in the net clutch 23 is thrown into engagement and the power roller will then be rotated through the driving connection provided by shafts 9, 12 and 16 and sprocket chain 22.

It will be observed that the driving connection thus provided permits of the free turning of the net table upon its axis, and that the driving connection also permits of the ready disengagement of the power roller from the same.

Various changes may be made without departing from the spirit of the invention as claimed.

What is claimed is:

The combination with a boat, of a net table forming a support and receptacle for the net and rotatably mounted on said boat and having a net roller, a rotating power shaft, a universal driving connection between said shaft and said roller, a clutch between said shaft and said driving connection, and a second clutch between said driving connection and said roller.

In testimony whereof I have signed my name to this specification.

RALPH A. GAERTNER.